(12) United States Patent
Kim

(10) Patent No.: US 10,645,453 B2
(45) Date of Patent: May 5, 2020

(54) ELECTRONIC DEVICE, IMAGE PROCESSING METHOD THEREOF, AND NON-TRANSITORY COMPUTER READABLE RECORDING MEDIUM

(71) Applicant: SAMSUNG ELECTRONICS CO., LTD., Suwon-si, Gyeonggi-do (KR)

(72) Inventor: Byoung-chul Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/858,596

(22) Filed: Dec. 29, 2017

(65) Prior Publication Data

US 2018/0205992 A1    Jul. 19, 2018

(30) Foreign Application Priority Data

Jan. 18, 2017  (KR) .................... 10-2017-0008601

(51) Int. Cl.

| | |
|---|---|
| *H04N 21/235* | (2011.01) |
| *H04N 21/45* | (2011.01) |
| *H04N 21/435* | (2011.01) |
| *H04N 21/643* | (2011.01) |
| *H04N 21/258* | (2011.01) |
| *H04N 21/4627* | (2011.01) |
| *H04N 21/4623* | (2011.01) |

(52) U.S. Cl.
CPC ..... *H04N 21/4516* (2013.01); *H04N 21/2351* (2013.01); *H04N 21/25875* (2013.01); *H04N 21/4353* (2013.01); *H04N 21/4623* (2013.01); *H04N 21/4627* (2013.01); *H04N 21/643* (2013.01)

(58) Field of Classification Search
CPC .............. H04N 21/2351; H04N 21/25875
See application file for complete search history.

(56) References Cited

U.S. PATENT DOCUMENTS

| | | | |
|---|---|---|---|
| 7,986,781 B2 | 7/2011 | Stransky | |
| 9,031,235 B2 | 5/2015 | DePietro et al. | |
| 9,307,287 B2 | 4/2016 | Bartel-Kurz et al. | |
| 9,385,997 B2 | 7/2016 | Okimoto et al. | |

(Continued)

FOREIGN PATENT DOCUMENTS

| | | |
|---|---|---|
| KR | 10-2013-0034026 | 4/2013 |
| KR | 10-1342743 | 12/2013 |

OTHER PUBLICATIONS

Search Report and Written Opinion dated Apr. 19, 2018 from International Patent Application No. PCT/KR2018/000116, 8 pages.

*Primary Examiner* — Olugbenga O Idowu
(74) *Attorney, Agent, or Firm* — Staas & Halsey LLP

(57) ABSTRACT

An electronic device, an image processing method thereof, and a non-transitory computer readable recording medium are provided. The image processing method for the electronic device includes receiving an image signal; extracting, by a middleware layer, an entitlement management message (EMM) from the image signal; transmitting the extracted EMM to a web browser based application of an application layer; confirming, by the application, a user authority using the extracted EMM; extracting, by the middleware layer, a control word (CW) if the authority for the image signal is confirmed; and descrambling the image signal using the extracted control word.

19 Claims, 7 Drawing Sheets

(56) References Cited

U.S. PATENT DOCUMENTS

| | | |
|---|---|---|
| 9,986,287 B2 | 5/2018 | Bartel-Kurz et al. |
| 2010/0115547 A1* | 5/2010 | Choi ..................... H04N 7/163 |
| | | 725/31 |
| 2010/0287609 A1 | 11/2010 | Gonzalez et al. |
| 2011/0211694 A1 | 9/2011 | Petrus Maria Van De Ven |
| 2011/0299683 A1 | 12/2011 | Candelore |
| 2012/0257749 A1* | 10/2012 | Gremaud ............. H04N 7/1675 |
| | | 380/210 |
| 2013/0097687 A1* | 4/2013 | Storm ................. H04L 63/0807 |
| | | 726/9 |
| 2013/0152121 A1 | 6/2013 | Bartel-Kurz et al. |
| 2013/0262869 A1 | 10/2013 | Roelse |
| 2014/0177833 A1 | 6/2014 | Helms et al. |
| 2014/0310740 A1 | 10/2014 | Bartel-Kurz et al. |
| 2016/0241900 A1* | 8/2016 | Skirrow ........... H04N 21/26606 |

* cited by examiner

ELECTRONIC DEVICE, IMAGE PROCESSING METHOD THEREOF, AND NON-TRANSITORY COMPUTER READABLE RECORDING MEDIUM

CROSS-REFERENCE TO RELATED APPLICATIONS

This application claims priority from Korean Patent Application No. 10-2017-0008601 filed on Jan. 18, 2017 in the Korean Intellectual Property Office, the disclosure of which is incorporated herein by reference in its entirety.

BACKGROUND

1. Field

The present disclosure relates to an electronic device, an image processing method thereof, and a non-transitory computer readable recording medium, and more particularly, to an electronic device, an image processing method thereof, and a non-transitory computer readable recording medium, which can implement client software of a conditional access system to operate based on a web browser and can quickly load a control word.

2. Description of the Related Art

A conditional access system (CAS) is a control system capable of providing image content only to users who subscribe to a service in a system that provides image content.

In the related art, CAS client software for using a conditional access system has been distributed offline through a smart card or a PCMCIA card. However, such a method has the problems that it is difficult to promptly cope with problem occurrence and to update the software. Accordingly, a method has been proposed to distribute the CAS client software online and to store the distributed software in a set-top box or a display so as to use the software.

Due to the characteristic of the CAS client software that requires high security, such an online distribution method has been implemented so that the CAS client software is embedded in middleware. Accordingly, authority control of a set-top box subscriber and control word setting are all performed in the middleware layer, and in order to update the CAS function, it is required to update the middleware software of the set-top box or display as a while.

As the capacity of the middleware software becomes massive, a problem has occurred that content reproduction is interrupted during updating of the software. Further, as the CAS client software is embedded in the middleware software, it is required that the CAS client software is properly ported to respective pieces of the middleware software.

SUMMARY

Exemplary embodiments of the present disclosure overcome the above disadvantages and other disadvantages not described above, and provide an electronic device, an image processing method thereof, and a non-transitory computer readable recording medium, which can separately implement a conditional access system (CAS) in a middleware layer and an application layer, and can solve a delay of control word loading due to such separate implementation of the CAS.

According to an aspect of the present disclosure, an image processing method for an electronic device includes receiving an image signal; extracting, by a middleware layer, an entitlement management message (EMM) from the image signal; transmitting the extracted EMM to a web browser based application of an application layer; confirming, by the application, a user authority using the extracted EMM; extracting, by the middleware layer, a control word (CW) if the authority for the image signal is confirmed; and descrambling the image signal using the extracted control word.

The image processing method according to the aspect of the present disclosure may further include transmitting, by the application, control word location information in an entitlement control message (ECM) to the middleware layer if the authority for the image signal is confirmed.

The control word location information may include a flag, control word start location information in the ECM, control word length information, and encryption method information.

The extracting the control word may include extracting, by the middleware layer, the control word from the ECM using the control word start location and the control word length information in the ECM.

The control word location information may be transmitted to the middleware layer via a java script library layer and a webkit engine layer.

The java script library layer may provide an API for connecting the application layer and the middleware layer to each other, and the webkit engine layer may support an HTML5 so that the application can operate based on a web browser.

The extracting the control word may include extracting an entitlement control message (ECM) from the middleware layer and transmitting the extracted ECM to the application; and extracting, by the application, the control word from the received ECM and transmitting the extracted control word to the middleware layer.

The image processing method according to the aspect of the present disclosure may further include updating the application regardless of updating of the middleware layer.

The application may be an HTML5 based application.

According to another aspect of the present disclosure, an electronic device includes a communicator configured to receive an image signal; and a processor composed of a middleware layer and an application layer to descramble the received image signal, wherein the processor is configured to extract an entitlement management message (EMM) from the image signal, to transmit the extracted EMM to a web browser based application of an application layer, to confirm, by the application, a user authority using the extracted EMM, to extract, by the middleware layer, a control word (CW) if the authority for the image signal is confirmed, and to descramble the image signal using the extracted control word.

The processor may transmit, by the application, control word location information in an entitlement control message (ECM) to the middleware layer if the authority for the image signal is confirmed.

The control word location information may include a flag, control word start location information in the ECM, control word length information, and encryption method information.

The processor may be configured to extract, by the middleware layer, the control word from the ECM using the control word start location and the control word length information in the ECM.

The control word location information may be transmitted to the middleware layer via a java script library layer and a webkit engine layer.

The java script library layer may provide an API for connecting the application layer and the middleware layer to each other, and the webkit engine layer may support an HTML5 so that the application can operate based on a web browser.

The processor may be configured to extract an entitlement control message (ECM) from the middleware layer to transmit the extracted ECM to the application, and to extract, by the application, the control word from the received ECM to transmit the extracted control word to the middleware layer.

The processor may be configured to update the application regardless of updating of the middleware layer.

The application may be an HTML5 based application.

According to still another aspect of the present disclosure, a non-transitory computer readable recording medium including a web browser based application for executing an image processing method for an electronic device, wherein the image processing method includes confirming a user authority for an image signal using an entitlement management message (EMM) transmitted from a middleware layer; and transmitting to the middleware control word information in the EMM if the authority for the image signal is confirmed.

According to yet still another aspect of the present disclosure, a non-transitory computer readable recording medium including a program of a middleware layer for executing an image processing method for an electronic device, wherein the image processing method includes extracting an entitlement management message (EMM) from an image signal; transmitting the extracted EMM to a web browser based application of an application layer; extracting a control word (CW) from the EMM if an authority for the image signal is confirmed by the application; and descrambling the image signal using the extracted control word.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Hereinafter, exemplary embodiments of the present disclosure will be described in detail with reference to the accompanying drawings. In describing the present disclosure, well-known element structures and technologies are not described in detail since they would obscure the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined on the basis of the contents of the whole description of the present disclosure.

In the description, the terms "first, second, and so forth" are used to describe various elements regardless of their order or importance and to discriminate one element from other elements, but are not limited to the corresponding elements. For example, a first element and a second element may indicate different elements regardless of their order or importance. For example, without departing from the scope of the present disclosure, the first element may be called the second element, and the second element may be called the first element in a similar manner. The term "and/or" may include all possible combinations of items that are enumerated together.

The terms used in the description are used to merely describe a specific embodiment, but may not intend to limit the scope of other embodiments. In the description, a singular expression may include a plural expression unless specially described. The term "includes" or "has" used in the description represents that features, figures, steps, operations, constituent elements, components, or combinations thereof exist, and thus the term should be understood that existence or addition of one or more other features, figures, operations, constituent elements, components, or combinations thereof are not pre-excluded.

In exemplary embodiments of the present disclosure, the term "module" or "unit", as used herein, means, but is not limited to, software or hardware component or a combination thereof, which performs certain tasks. Further, "a plurality of modules or units" may be integrally formed as at least one module and may be implemented by at least one processor except for "modules" or "units" that are required to be implemented by specific hardware.

Hereinafter, the present disclosure will be described in detail using the accompanying drawings.

Figure 1:
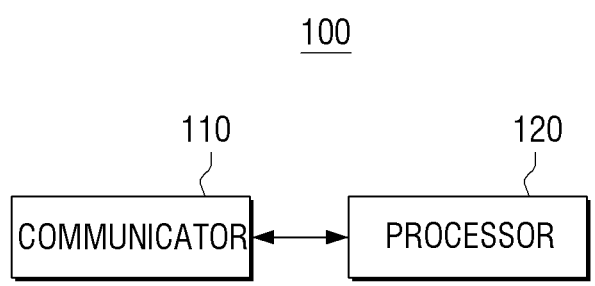
FIG. 1 is a schematic block diagram illustrating the configuration of an electronic device according to an embodiment of the present disclosure.

FIG. 1 is a schematic block diagram illustrating the configuration of an electronic device 100 according to an embodiment of the present disclosure. For example, the electronic device 100 may be implemented by a set-top box (STB) or a display device. The electronic device 100 may be implemented by an independent device, such as a set-top box, a smart TV, or a DVD player, or may be implemented by an internal device included in the display device or a receiver.

Referring to FIG. 1, the electronic device 100 may include a communicator 110 and a processor 120.

The communicator 110 may receive an image signal. Further, the communicator 110 may communicate with a CAS server to transmit and receive a CAS related control signal and data.

The processor 120 may confirm a user authority using CAS client software, and may descramble the scrambled image signal. In an embodiment of the present disclosure, the CAS client software may be implemented separately from a middleware layer and an application layer.

The CAS client software (hereinafter referred to as "CAS client manager") implemented in the middleware layer may extract an entitlement management message (EMM) and an entitlement control message (ECM) from the received image signal.

A CAS application implemented in the application layer may communicate with a CAS server to confirm the user authority for the image signal. Further, the CAS application may extract a control word (CW) from the ECM. The control word (CW) is a security code used to descramble the scrambled image signal.

The CAS client software is implemented to be separated into the CAS client manager of the middleware layer and a CAS client application of the application layer. Accordingly, the middleware layer should extract and transmit the entitlement control message (ECM) to the application layer, and the application layer should extract the control word (CW) from the ECM to transmit the extracted CW to the middleware layer.

In an embodiment of the present disclosure, the CAS application may acquire location information of the control word (CW) in the entitlement control message (ECM) to transmit the acquired location information of the CW to the CAS client manager of the middleware layer. The CAS client manager may extract the control word (CW) from the entitlement control message (ECM) using the location information of the control word (CW). Through this, the electronic device 100 may prevent a delay due to communication between the middleware layer and the application layer. This method may be called fast CW loading.

Figure 2:
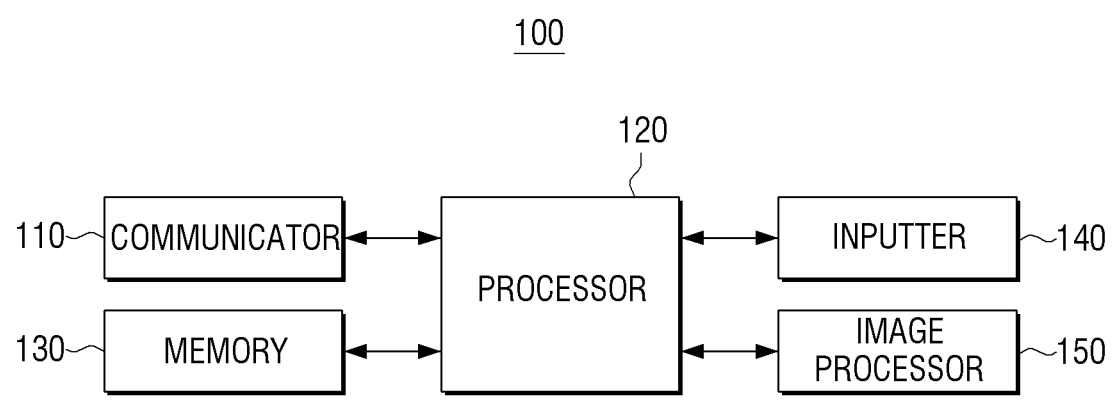
FIG. 2 is a block diagram illustrating in detail the configuration of an electronic device according to an embodiment of the present disclosure.

FIG. 2 is a block diagram illustrating in detail the configuration of an electronic device 100 according to an embodiment of the present disclosure. Referring to FIG. 2, the electronic device 100 may include a communicator 110, a processor 120, a memory 130, an inputter 140, and an image processor 150.

In addition to the constituent elements illustrated in FIG. 2, the electronic device 100 may include various configurations, such as a display (not illustrated), an audio processor (not illustrated), an audio outputter (not illustrated), and a power supply (not illustrated). Further, the electronic device 100 is not limited to such implementation including all the configurations as illustrated in FIG. 2.

The communicator 110 may receive an image signal through various sources. For example, the communicator 110 may receive broadcasting data from an external broadcasting station. As another example, the communicator 110 may receive streamed image data from an external server.

The communicator 110 may perform transmission and reception with a CAS server in accordance with various communication methods. For example, the communicator 110 may request the CAS server to confirm user authority. The communicator 110 may include various communication chips that support wire/wireless communications. For example, the communicator 110 may include communication chips that operate in wired LAN, wireless LAN, WiFi, Bluetooth (BT), and near field communication (NFC) methods.

The memory 130 may store therein various modules, software, and data for driving the electronic device 100. For example, the memory 130 may store therein the operating system (OS), middleware, a webkit engine, java script library, and applications.

The memory 130 may be implemented in the form of a flash memory and a hard disk. For example, the memory 130 may be provided with a ROM for storing programs for performing the operation of the electronic device 100, and a RAM for temporarily storing data in accordance with the operation performance of the electronic device 100. Further, the memory 130 may further include an electrically erasable and programmable ROM (EEPROM) for storing various kinds of reference data.

The inputter 140 may receive various user commands for controlling the electronic device 100. The inputter 140 may be implemented by a button and a touch pad, and may also be implemented by a separate device, such as a remote controller. If the electronic device 100 is implemented to include the display (not illustrated), the inputter 140 may be combined with the display (not illustrated) to be implemented as a touch screen. The touch screen may detect a touch input location, area, and touch input pressure.

The image processor 150 performs image processing with respect to image data received from the communicator 110 or image data descrambled by the processor 120. The image processor 150 may perform various image processes, such as image data scaling, noise filtering, frame rate conversion, and resolution conversion.

The processor 120 may control the above-described configurations of the electronic device. For example, the processor 120 may control the communicator 110 to transmit the descrambled image signal to an external display device. The processor 120 may be implemented by a single CPU, a plurality of processors, or an IP that performs a specific function.

Hereinafter, the operation of the electronic device 100 will be described in more detail with reference to the drawings.

Figure 3:
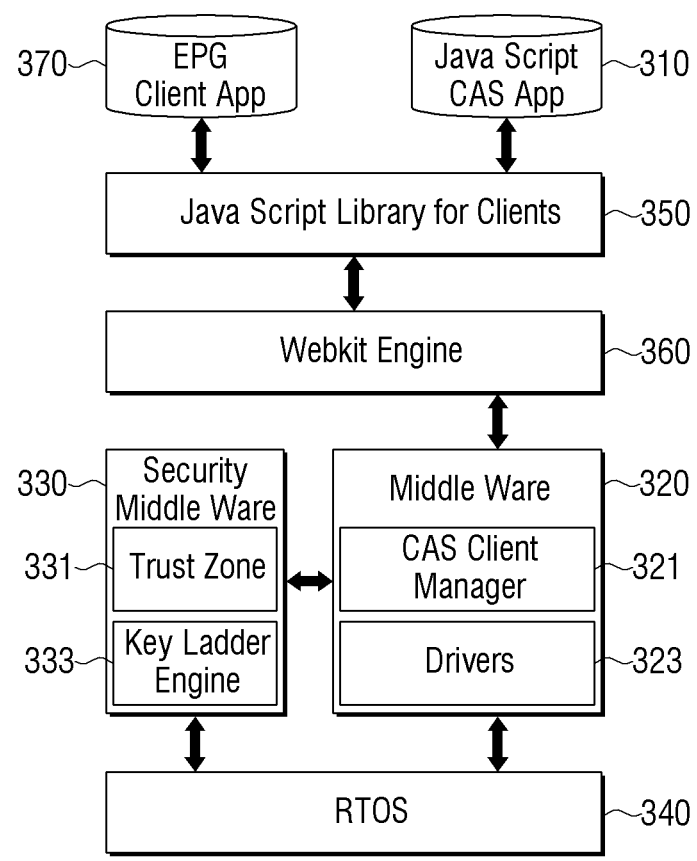
FIG. 3 is a diagram explaining the architecture of a conditional access system according to an embodiment of the present disclosure.

FIG. 3 is a diagram explaining the architecture of a conditional access system (CAS) according to an embodiment of the present disclosure. According to an embodiment of the present disclosure, the processor 120 may descramble the received image signal using CAS software that is separately implemented by a CAS client application of an application layer and a CAS client manager of a middleware layer.

Referring to FIG. 3, the CAS software may be composed of a java script CAS app 310 implemented by an HTML5 application and a CAS client manager 321 implemented by a software module of middleware.

First, the middleware layer is located on a real-time OS (RTOS) 340 at the lowermost end. The middleware layer may include middleware 320 and security middleware 330.

The middleware 320 may include a CAS client manager 321 that is a part of the CAS software and a driver 323 for controlling the hardware configuration of the electronic device 100. The CAS client manager 321 may extract an entitlement management message (EMM) and an entitlement control message (ECM) from the image signal. Further, the CAS client manager 321 may extract a control word (CW) from the entitlement control message (ECM) under the control of the java script CAS app 310.

The security middleware 320 may include a trust zone 331 providing a security region and a key ladder engine 333 in which the control word (CW) is set to descramble the image signal. The trust zone 331 may store therein various kinds of security keys, and only permitted software modules can access the security region.

Layers of a webkit engine 360 and a java script library 350 exist between layers of the middleware 320 and the application. Accordingly, a control signal and data that are transmitted and received between the CAS client manager 321 and the java script CAS app 310 are transmitted via the layers of the webkit engine 360 and the java script library 350. For example, location information of the control word (CW) that is transmitted by the java script CAS app 310 is transmitted to the CAS client manager 321 via the layers of the webkit engine 360 and the java script library 350.

The webkit engine 360 supports HTML5. Accordingly, the java script CAS app 310 that operates on the webkit engine 360 may be a web browser based application.

The java script library 350 may provide an API that relays between the application layer and the middleware layer. Since the java script library 350 exists, the java script CAS app 310 does not depend on a platform of the electronic device 100, and any platform that provides the HTML5 browser can operate without additional porting.

Various kinds of applications may exist on the application layer. For example, the java script CAS app 310 that provides the CAS function and an EPG client app 370 that provides an electronic program guide (EPG) function may belong to the application layer.

The java script CAS app 310 is an HTML5 based application. The java script CAS app 310 may confirm the user authority through performing of communication with the CAS server. Since the java script CAS app 310 is implemented separately from the middleware 320, it may update only the java script CAS app 310 regardless of the updating of the middleware 320.

Further, the java script CAS app 310 may provide the location information of the control word (CW) so that the CAS client manager 321 can directly extract the control word (CW) from the entitlement control message (ECM). Through this, the control word (CW) loading delay problem due to the separate implementation of the CAS software can be solved.

Hereinafter, a method for descrambling image information received in a fast CW loading method will be described.

Figure 4:
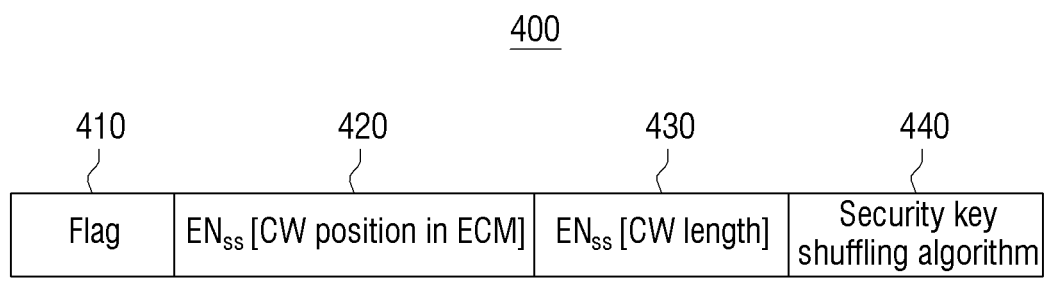
FIG. 4 is a diagram explaining the configuration of control word location information according to an embodiment of the present disclosure.

FIG. 4 is a diagram explaining the configuration of control word location information according to an embodiment of the present disclosure. As illustrated in FIG. 4, the java script CAS app 310 may configure a message for the fast CW loading. Referring to FIG. 4, the control word location information may include a flag 410, control word (CW) start location information 420 in the entitlement control message (ECM), control word (CW) length information 430, and encryption method information 440.

The flag field 410 is a field for determining enabling or disabling of a fast CW loading method, in which the java script CAS app 310 acquires the location information of the control word (CW) to transmit the acquired location information of the control word (CW) to the CAS client manager 321 of the middle layer, and the CAS client manager 321 directly extracts the control word (CW).

An $EN_{SS}$[CW position in ECM] field value 420 is a value of location information at which control word (CW) data starts in the entitlement control message (ECM). This value is encrypted by a security key. It is indicated that the location information is encrypted information, and for this, as shown in FIG. 4, a symbol $EN_{SS}$[ ] is used. In order to decode the encrypted information, the CAS client manager 321 may acquire the security key from a trust zone 331 of the security middleware 330.

An $EN_{SS}$ [CW length] field value 430 indicates the size of the control word (CW) data. In the same manner as the start location information, the data size value is also encrypted.

Using the start location of the control word (CW) data and the size of the control word (CW) data, the CAS client manager 321 may directly extract the control word (CW) from the entitlement control message (ECM).

At last, the location information of the control word (CW) may include a field 440 that indicates encryption method information. In order to heighten the security of the security key and the control word information encrypted by the security key, the processor 120 may not use the security key acquired from the trust zone 331 as it is, but may use a modified security key. Accordingly, the location information of the control word (CW) may include the field value 440 for a modification algorithm technique. The modification algorithm may be a predetermined algorithm between the CAS server that uses even, odd, or a specific bit value of the security key and the CAS client software.

Through using the fast CW loading method as described above, the electronic device 100 can shorten the required time in which the CAS client manager 321 transmits the entitlement control information (ECM) to the java script CAS app 310 and the java script CAS app 310 extracts the control word (CW) from the entitlement control information (ECM) to transmit the extracted control word (CW) to the CAS client manager 321.

As the result of an experiment through implementation of the electronic device 100 according to an embodiment of the present disclosure, it was confirmed that in the case of applying the fast CW loading method, 118 ms was consumed to shorten the required time of about 300 ms as compared with a case where 409 ms was consumed in the case of applying the general control word (CW) extraction method. Since the resultant value of the experiment was obtained under a specific condition, the time that can be shortened by the electronic device 100 according to an embodiment of the present disclosure is not limited to 300 ms at maximum.

Figure 5:
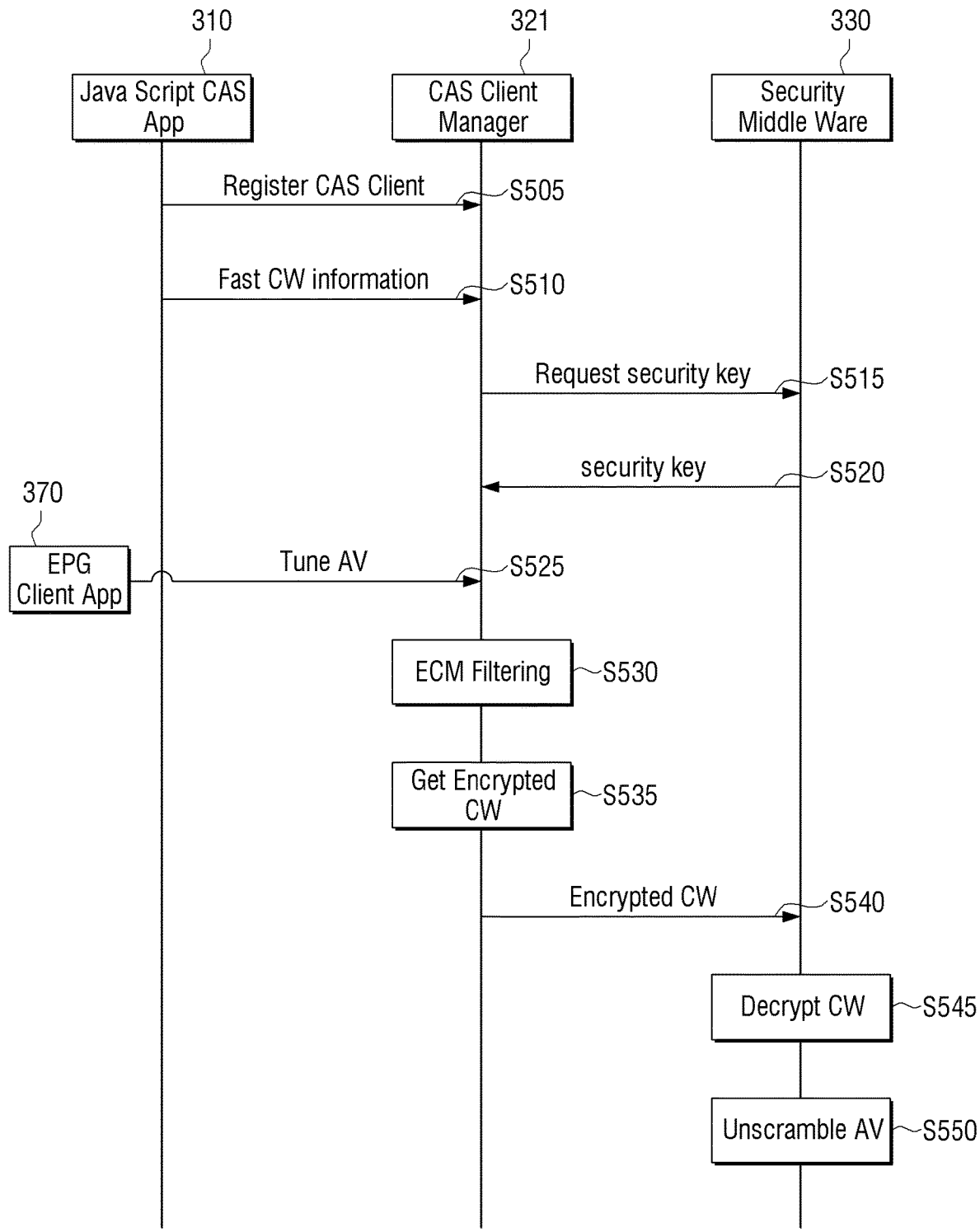
FIG. 5 is a sequential diagram explaining the operation of programs for performing an image processing method for an electronic device according to an embodiment of the present disclosure.

FIG. 5 is a sequential diagram explaining the operation of programs for performing an image processing method for an electronic device according to an embodiment of the present disclosure. Referring to FIG. 5, the fast CW loading method will be described in more detail.

Referring to FIG. 5, the java script CAS app 310 may perform a CAS client registration (S505). Specifically, the java script CAS app 310 may request authentication from the CAS client manager 321, and may be registered in the CAS client manager 321 through the authentication.

The registered java script CAS app 310 may transmit fast CW information so that the CAS client manager 321 can directly acquire the control word (CW) from the entitlement control message (ECM) (S510). The transmitted fast CW information may be the location information of the control word (CW) as illustrated in FIG. 4.

In order for the CAS client manager 321 to decode the start location information and length information of the control word (CW), a security key is necessary. The CAS client manager 321 may request the security key from the security middleware 330 (S515). The security middleware 330 may transmit the security key to the CAS client manager 321 (S520).

The EPG client app 370 may select an image signal (or broadcasting channel) (S525). Since the image signal selected by the EPG client app 370 has been scrambled, the CAS client manager 321 should descramble the image signal.

The CAS client manager 321 may extract the entitlement control message (ECM) from the image signal (S530). Using the location information of the control word (CW) received from the java script CAS app 310 and the security key received from the security middleware 330, the CAS client manager 321 may extract the control word (CW) from the entitlement control message (ECM) (S535). The CAS client manager 321 may transmit the extracted control word (CW) to the security middleware 330 (S540).

The security middleware 330 may descramble the selected image signal through setting of the control word (CW) in the key ladder engine 333 (S545 and S550).

Figure 6:
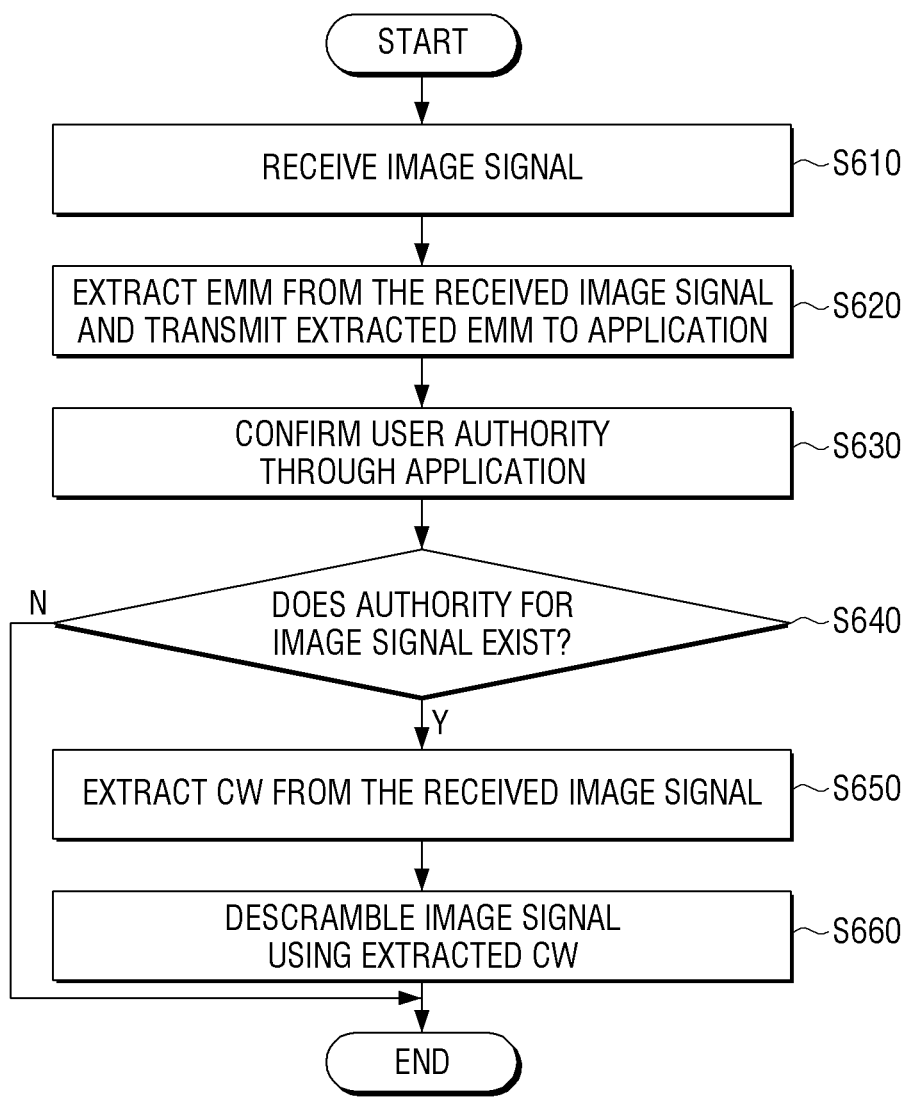
FIGS. 6 and 7 are flowcharts explaining an image processing method for an electronic device according to various embodiments of the present disclosure.

FIG. 6 is a flowchart explaining an image processing method for an electronic device according to an embodiment of the present disclosure. Referring to FIG. 6, the electronic device 100 may receive image signals from various sources (S610). For example, the electronic device 100 may receive an image signal that is provided as a paid service. The image signal that is provided as a paid service should be provided only to specific users, and thus it may be scrambled.

Using the software module of the middleware layer, the electronic device 100 may extract the entitlement management message (EMM) from the received image signal. Further, the electronic device 100 may transmit the extracted entitlement management message (EMM) to the software module of the application layer (S620).

Using the software module of the application layer, the electronic device 100 may confirm whether it has the viewing authority with respect to the received image signal (S630). For example, the electronic device 100 may confirm the viewing authority through communication with the CAS server that provides the paid service.

If it is confirmed that it has the authority for the image signal (S640-Y), the electronic device 100 may extract the entitlement control message (ECM) using the software module of the middleware layer. Then, the electronic device 100 may extract the control word (CW) from the entitlement control message (ECM) using the software module of the middleware layer (S650). The software module of the application layer may acquire the location information of the control word (CW) in the entitlement control message (ECM) to transmit the acquired location information of the control word (CW) to the software module of the middleware layer. For example, the location information of the control word (CW) may include control word (CW) start location information and control word (CW) length information in the entitlement control message (ECM).

Using the control word (CW) start location information and the control word (CW) length information in the entitlement control message (ECM), the software module of the middleware may directly extract the control word (CW) from the entitlement control message (ECM).

Further, the electronic device 100 may descramble the image signal using the extracted control word (CW) (S660). For example, the electronic device 100 may descramble the image signal through the security region provided by the security middleware.

Figure 7:
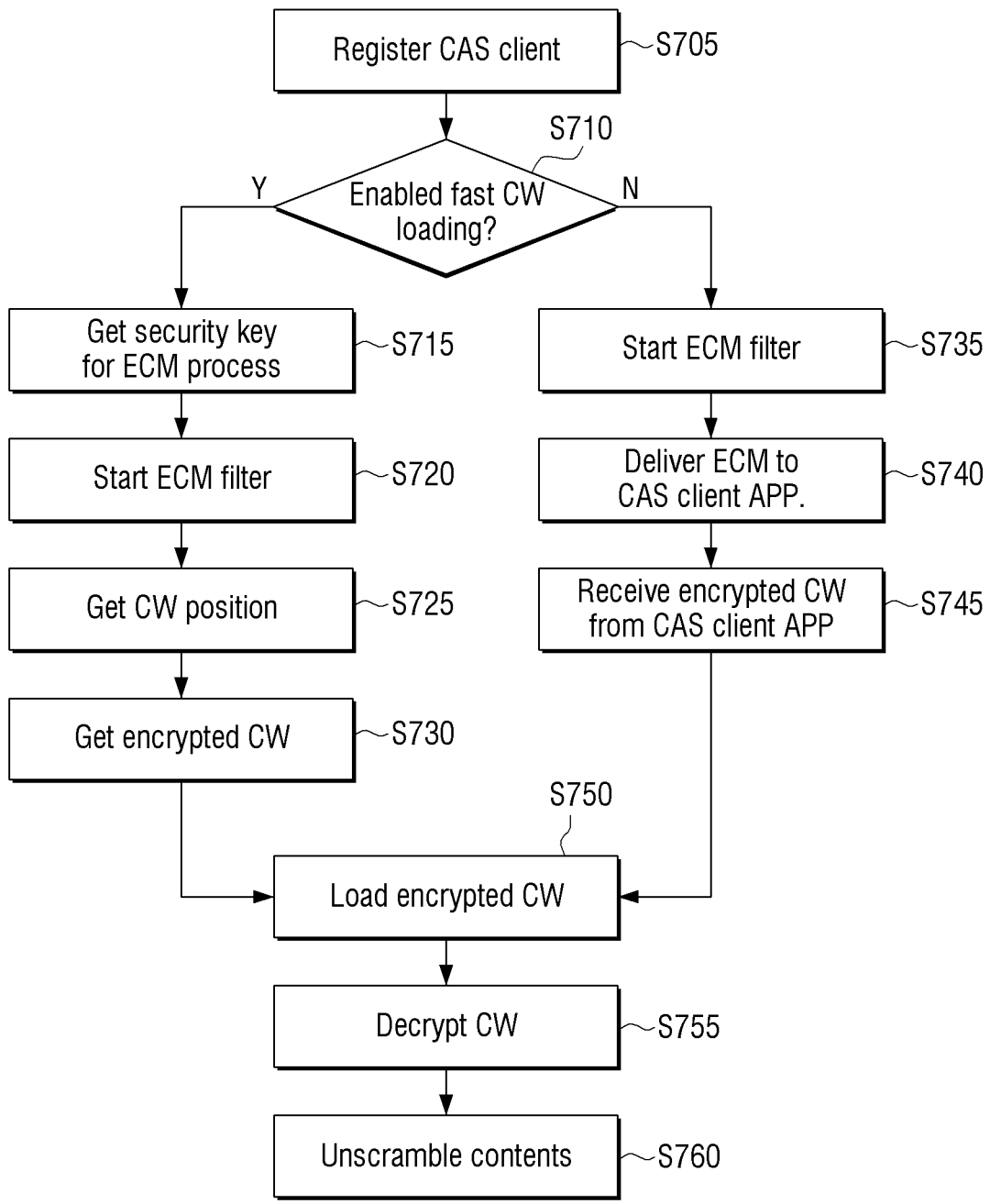

FIG. 7 is a flowchart explaining an image processing method for an electronic device 100 according to another embodiment of the present disclosure. FIG. 7 illustrates the operation of the electronic device 100 after the electronic device 100 confirms the authority for the received image signal from a CAS server.

The electronic device 100 may register the CAS client app of the application layer in the software module (CAS client manager) of the middleware layer (S705). Using a flag field included in the control word (CW) location information provided by the CAS client app, the electronic device 100 may determine whether to perform the fast CW loading method (S710).

If it is determined to perform the fast CW loading method (S710-Y), the electronic device 100 may acquire the security key for decoding the control word (CW) location information using the software module of the middleware layer (S715).

Then, the electronic device 100 may acquire the entitlement control message (ECM) from the image signal using the software module of the middleware layer (S720). Then, using the acquired security key, the electronic device 100 may acquire the location of the control word (CW) data in the entitlement control message (ECM) (S725). Using the software module of the middleware layer, the electronic device 100 may acquire the control word (CW) without intervention of the CAS client app of the application layer (S730).

In contrast, if it is determined not to perform the fast CW loading method (S710-N), the electronic device 100 may acquire the entitlement control message (ECM) from the image signal using the software module of the middleware layer (S735). Then, the electronic device 100 may transmit the acquired entitlement control message (ECM) to the CAS client app of the application layer (S740).

Using the CAS client app of the application layer, the electronic device 100 may extract the control word (CW) from the entitlement control message (ECM). Then, the electronic device 100 may transmit the extracted control word (CW) to the software module of the middleware layer (S745).

In the case where the fast CW loading method is not used, as described above, data transmission is performed twice between the middleware layer and the application layer. Accordingly, a delay may occur in the control word loading.

The electronic device 100 may load and decode the extracted control word (CW) (S750 and S755). Then, the electronic device 100 may descramble the image signal using the decoded control word (S760).

As described above, according to various embodiments of the present disclosure, the electronic device 100 can separately implement the CAS software in the middleware layer and the application layer. Since only the software implemented in the application layer can be updated, the electronic device 100 can solve the inconvenience of updating the whole middleware for the CAS function.

Further, since the electronic device 100 acquires the location information of the control word (CW) in the entitlement control message (ECM) from the application layer and transmits the acquired location information of the control word (CW) to the middleware layer, the loading delay problem of the control word due to the data transmission between the middleware layer and the application layer caused by the separate software implementation can be solved.

The above-described methods may be implemented in the form of program instructions that can be performed through various computer means, and may be recorded on a computer readable medium. The computer readable medium may include program instructions, data files, and data structures solely or in combination. The program instructions that are recorded on the medium may be specially designed and configure for the present disclosure, or may be known and available to computer software providers. Examples of the computer readable recording media may include hardware devices specially configured to store and perform program instructions, such as magnetic media, such as a hard disk, a floppy disk, and a magnetic tape, an optical media, such as a CD-ROM and a DVD, a magneto-optical media, such as a floptical disk, a ROM, a RAM, and a flash memory. Examples of the program instructions may include not only machine codes that are made by compilers but also high-class language codes that can be executed by computers using interpreters and the like. The hardware devices may be configured to operate as one or more software modules in order to perform the operation according to the present disclosure, and vice versa.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An image processing method for an electronic device, comprising:
    receiving an image signal;
    extracting, by a middleware layer, an entitlement management message (EMM) from the image signal;
    transmitting, by the middleware layer, the extracted EMM to an application of an application layer;
    confirming, by the application, a user authority for the image signal using the extracted EMM;
    extracting, by the middleware layer and without intervention of the application layer, a control word (CW) if the user authority for the image signal is confirmed based on the extracted EMM; and
    descrambling, by the middleware layer, the image signal using the extracted control word.

2. The image processing method as claimed in claim 1, further comprising:
    transmitting, by the application, control word location information in an entitlement control message (ECM) to the middleware layer if the user authority for the image signal is confirmed.

3. The image processing method as claimed in claim 2, wherein the control word location information comprises a flag, control word start location information in the ECM, control word length information, and encryption method information.

4. The image processing method as claimed in claim 3, wherein the extracting the control word comprises extracting, by the middleware layer, the control word from the ECM using the control word start location and the control word length information in the ECM.

5. The image processing method as claimed in claim 2, wherein the control word location information is transmitted, by the application, to the middleware layer via a java script library layer and a webkit engine layer.

6. The image processing method as claimed in claim 5, wherein the java script library layer provides an API for connecting the application layer and the middleware layer to each other, and
    the webkit engine layer supports an HTML5 so that the application can operate based on a web browser.

7. The image processing method as claimed in claim 1, wherein the extracting the control word comprises:
    extracting, by the middleware layer, an entitlement control message (ECM) from the image signal and transmitting the extracted ECM to the application; and
    extracting, by the application, the control word from the received ECM and transmitting the extracted control word to the middleware layer.

8. The image processing method as claimed in claim 1, further comprising:
    updating the application regardless of updating of the middleware layer.

9. The image processing method as claimed in claim 1, wherein the application is an HTML5 based application.

10. An electronic device comprising:
    a communicator configured to receive an image signal;
    a memory storing instructions; and
    a processor that executes the instructions to thereby form software layers composed of a middleware layer and an application layer to descramble the received image signal,
    wherein the processor is configured to
        extract, by the middleware layer, an entitlement management message (EMM) from the image signal,
        transmit, by the middleware layer, the extracted EMM to an application of an application layer,
        confirm, by the application, a user authority using the extracted EMM,
        extract, by the middleware layer and without intervention of the application layer, a control word (CW) if the user authority for the image signal is confirmed based on the extracted EMM, and
        descramble, by the middleware layer, the image signal using the extracted control word.

11. The electronic device as claimed in claim 10, wherein the processor is further configured to transmit, by the application, control word location information in an entitlement control message (ECM) to the middleware layer if the user authority for the image signal is confirmed.

12. The electronic device as claimed in claim 11, wherein the control word location information comprises a flag, control word start location information in the ECM, control word length information, and encryption method information.

13. The electronic device as claimed in claim 12, wherein, to extract the control word, the processor is further configured to extract, by the middleware layer, the control word from the ECM using the control word start location and the control word length information in the ECM.

14. The electronic device as claimed in claim 11, wherein the control word location information is transmitted, by the application, to the middleware layer via a java script library layer and a webkit engine layer.

15. The electronic device as claimed in claim 14, wherein the java script library layer provides an API for connecting the application layer and the middleware layer to each other, and
    the webkit engine layer supports an HTML5 so that the application can operate based on a web browser.

16. The electronic device as claimed in claim 10, wherein, to extract the control word, the processor is further configured to
    extract, by the middleware layer, an entitlement control message (ECM) from the middleware layer and transmit the extracted ECM to the application, and
    extract, by the application, the control word from the received ECM and transmit the extracted control word to the middleware layer.

17. The electronic device as claimed in claim 10, wherein the processor is further configured to update the application regardless of updating of the middleware layer.

18. The electronic device as claimed in claim 10, wherein the application is an HTML5 based application.

19. A non-transitory computer readable recording medium for executing, by a processor, an image processing method for an electronic device, the method comprising
- receiving an image signal;
- extracting, by a middleware layer, an entitlement management message (EMM) from the image signal;
- transmitting, by the middleware layer, the extracted EMM to an application of an application layer;
- confirming, by the application, a user authority for the image signal using the extracted EMM transmitted from the middleware layer;
- extracting, by the middleware layer and without intervention of the application layer, a control word (CW) if the user authority for the image signal is confirmed based on the extracted EMM; and
- descrambling, by the middleware layer, the image signal using the extracted control word.

* * * * *